United States Patent
Vitale

(12) 
(10) Patent No.: US 6,923,197 B2
(45) Date of Patent: Aug. 2, 2005

(54) PRESSURE REGULATOR WITH TAMPER-PROOF SAFETY FEATURE

(75) Inventor: Steven Vitale, Staten Island, NY (US)

(73) Assignee: KeySpan Energy, Brooklyn, NY (US)

( * ) Notice: Subject to any disclaimer, the term of this patent is extended or adjusted under 35 U.S.C. 154(b) by 236 days.

(21) Appl. No.: 10/353,970

(22) Filed: Jan. 30, 2003

(65) Prior Publication Data

US 2004/0154667 A1 Aug. 12, 2004

(51) Int. Cl.$^7$ ............................................. G05D 16/02
(52) U.S. Cl. ...................... 137/12; 137/14; 137/505.12; 137/505.15; 137/505.18; 137/505.42
(58) Field of Search ....................... 137/12, 14, 505.12, 137/505.15, 505.18, 505.42, 505.43

(56) References Cited

U.S. PATENT DOCUMENTS

| | | | |
|---|---|---|---|
| 2,192,630 A | | 3/1940 | Beam |
| 2,318,721 A | * | 5/1943 | Siver ...................... 137/505.43 |
| 2,642,701 A | * | 6/1953 | Goodner ................ 137/505.12 |
| 3,433,262 A | | 3/1969 | Ray |
| 3,443,583 A | | 5/1969 | Topits et al. |
| 3,576,193 A | * | 4/1971 | Rothfuss et al. ........ 137/505.41 |
| 3,635,442 A | | 1/1972 | Ulbing |
| 5,139,046 A | * | 8/1992 | Galli ...................... 137/505.42 |
| 5,746,245 A | | 5/1998 | Foster |
| 5,752,544 A | | 5/1998 | Yves |
| 5,755,254 A | | 5/1998 | Carter et al. |

* cited by examiner

*Primary Examiner*—Steven M. Hepperle
(74) *Attorney, Agent, or Firm*—Dickstein Shapiro Morin & Oshinsky LLP

(57) ABSTRACT

A pressure regulating system having a tamper-proof safety feature. A pair of seats are mounted to an annular pipe. A first bleed pipe, with a fixed restriction, extends from an inlet conduit to a first chamber. The first chamber is separated from a second chamber by a second diaphragm. A second bleed pipe extends from the second chamber to an outlet pipe. A bleed off mechanism is sealed within the outlet conduit and includes a compressible bellows. When compressed, which occurs when a predetermined pressure level is attained in the outlet conduit, a third seat is moved out of sealing relation with the outlet conduit and the first chamber. This creates an imbalance of the pressures in the chambers that leads to the pair of seats being moved to seal off apertures in the inlet conduit, thereby inhibiting flow into the outlet conduit.

21 Claims, 5 Drawing Sheets

US 6,923,197 B2

PRESSURE REGULATOR WITH TAMPER-PROOF SAFETY FEATURE

FIELD OF THE INVENTION

The invention generally relates to pressure regulators, and more particularly to pressure regulators having a safety feature which inhibits tampering.

BACKGROUND

Some conventionally known pressure regulators operate in a mode of operation known as "fail open". Such "fail open" regulators include a spring biased against a diaphragm in such a way that failure of the diaphragm (such as through rupture) causes the regulator to remain open allowing an unregulated flow of fluid. Other conventionally known pressure regulators operate in a mode known as "fail closed", wherein the spring is biased against the diaphragm in such a way that failure of the diaphragm causes the regulator to close, preventing any flow of fluid. Yet other conventionally known pressure regulators are merely operating control valves in a fixed position, such that failure of the regulator does not open or close the regulator. Essentially, all conventional pressure regulators operate by sensing the downstream pressure and controlling the flow of fluid based upon the downstream pressure. Thus, all conventional pressure regulators also utilize a sensor positioned at a downstream location and in communication with the regulator through a sensor transmission line.

With reference to FIG. 1, a conventional dual port "fail open" type of pressure regulator system 10 is shown having a diaphragm 12, a spring 14, a rod 16, an annular pipe 22, and first and second seats 38 and 42. The spring 14 is loaded to exert a force on the diaphragm 12 corresponding to a desired outlet pressure $P_2$ within an outlet conduit 36. The rod 16 includes a collar 18 connected to the pipe 22. While an annular pipe 22 is shown, it should be appreciated that any form of pipe with or without an annulus, including for example, a rod or a piston, may be used. Further, although a dual port regulator system is shown, it should be appreciated that a single port regulator system may be used.

The pressure regulator 10 is illustrated in the open position. In operation, the pressure regulator 10 reduces an inlet gas pressure $P_1$ within an inlet conduit 32 to the outlet gas pressure $P_2$ by bleeding gas past apertures 40 and 44. In normal operation, while the outlet gas pressure $P_2$ is below a certain threshold amount, the diaphragm 12 and the spring 14 exert a biasing force through the rod 16 and the collar 18 onto the annular pipe 22 and the seats 38 and 42, pushing and maintaining the seats 38 and 42 out of sealing arrangement with the apertures 40 and 44.

Upon the downstream or outlet gas pressure $P_2$ exceeding a desired level, the pressure regulator 10 closes or restricts the apertures 40 and 44 by moving sealing surfaces $46_a$ and $46_b$ of, respectively, seats 38 and 42, into sealing contact with the apertures 40 and 44 of the conduit 32, thereby closing off the source of $P_1$.

A disadvantage to the conventional pressure regulator systems, such as the system illustrated in FIG. 1, is that such systems could be intentionally tampered with or unintentionally adjusted improperly. For example, if the sensor transmission line were sabotaged, i.e. cut, the pressure regulator system would not be able to determine an increase in the downstream $P_2$. Instead, the pressure regulator would read a zero value for the downstream $P_2$. In addition, the maximum pressure set point of such systems can be affected by pressure from the environment. Further, pressure regulators are often positioned in underground vaults nearby piping, and in circumstances where flooding of the underground vaults has occurred, increased pressure on the exterior of the chamber holding the diaphragm 12 (from the hydrostatic head of the flooding) counteracts the pressure from the spring 14, resulting in an improperly functioning diaphragm 12. In these undesired states, outlet pressures higher than those desired for normal operation are delivered, which has the potential for adverse results.

SUMMARY

The invention provides a pressure regulating system for regulating pressure in a flow system having an inlet conduit with an inlet pressure and an outlet conduit with an outlet pressure. The pressure regulating system includes a first pressure regulator, that has a first diaphragm, a first rod connected to the first diaphragm, a first spring positioned to exert a force on the first diaphragm and the first rod, a pipe receiving an end of the first rod, and at least one seat mounted on the pipe, each seat being capable of sealing a respective aperture in the inlet conduit. The pressure regulating system further includes a second pressure regulator mounted in a location to inhibit tampering and including a bleed off mechanism mounted within and capable of inhibiting flow to the outlet conduit.

The invention also provides a method of inhibiting tampering of a pressure regulating system regulating pressure in a flow system having an inlet conduit with an inlet pressure and an outlet conduit with an outlet pressure. The method includes providing a first pressure regulator and a second pressure regulator. The first pressure regulator includes a first rod connected to a first diaphragm, a first spring positioned to exert a force on the first diaphragm and the first rod, a pipe receiving an end of the first rod, and at least one seat mounted on the pipe, each seat being capable of sealing a respective aperture in the inlet conduit. The second pressure regulator includes a first bleed pipe, a housing, the first bleed pipe extending from the inlet conduit into the housing, and a bleed off mechanism mounted within and capable of inhibiting flow to the outlet conduit. Upon the outlet pressure in the outlet conduit exceeding a predetermined value, the second pressure regulator is enabled to inhibit flow into the outlet conduit.

These and other advantages and features of the invention will be more readily understood from the following detailed description of the invention that is provided in connection with the accompanying drawings.

DETAILED DESCRIPTION OF PREFERRED EMBODIMENTS

Figure 1:
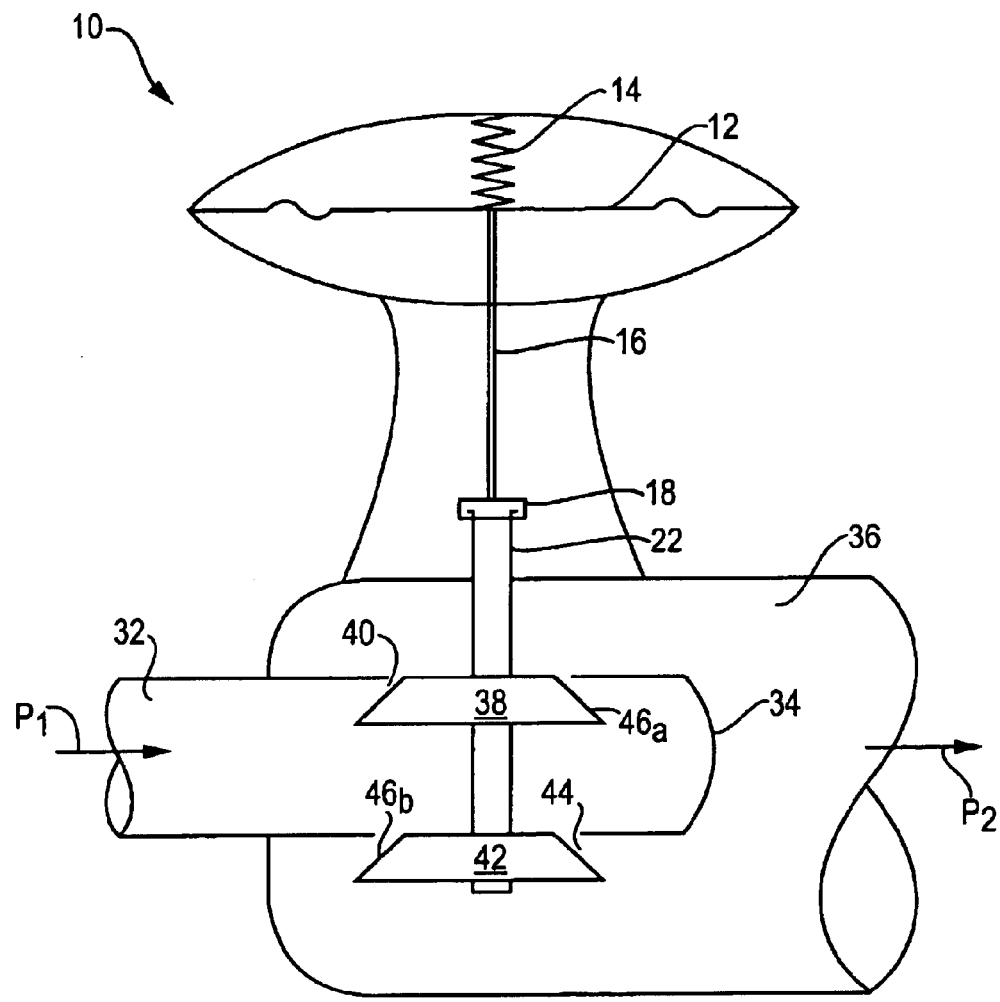
FIG. 1 illustrates a schematic view of a conventional pressure regulator.
Figure 2:
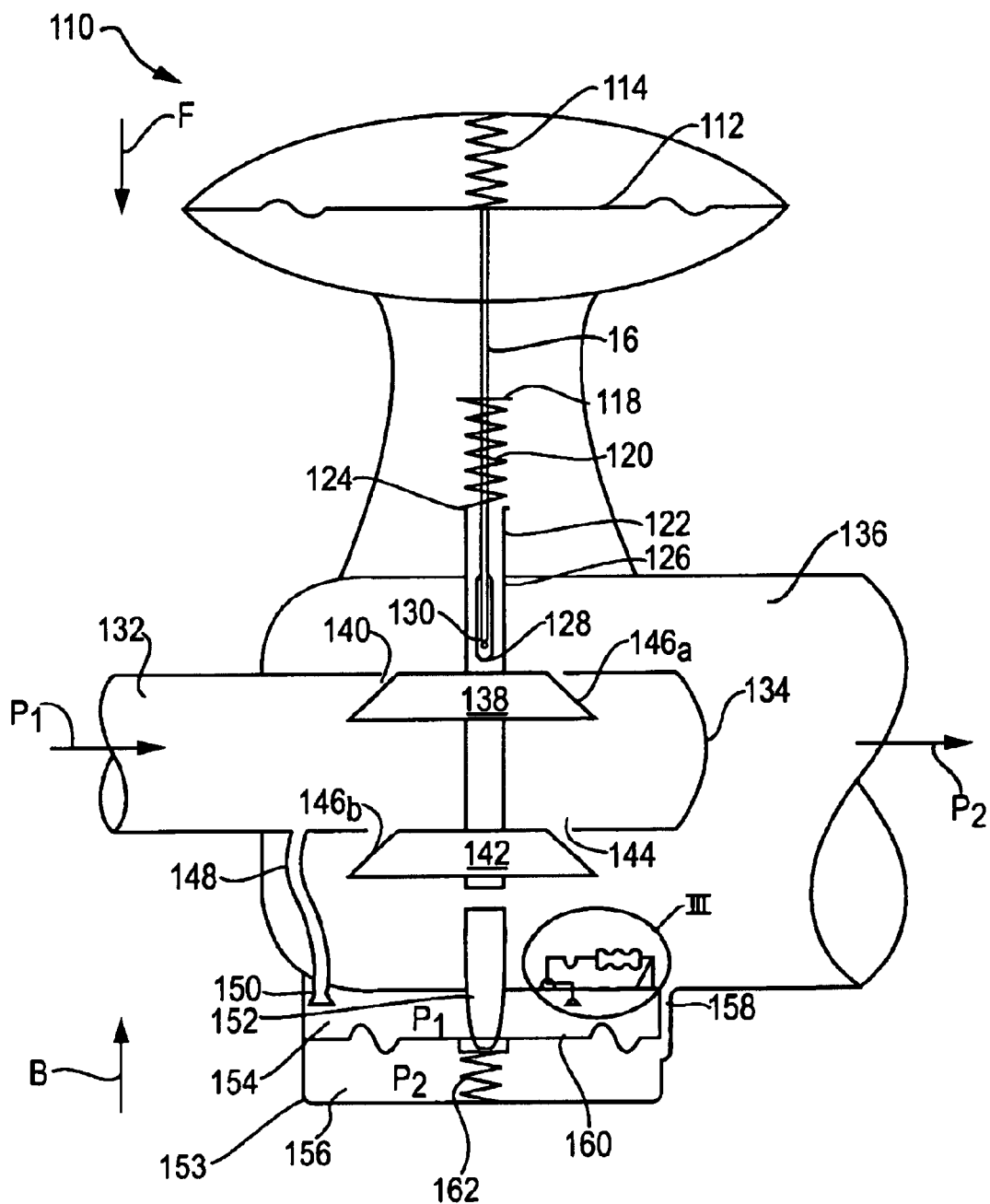
FIG. 2 illustrates a schematic view of a pressure regulator system constructed in accordance with an embodiment of the invention.
Figure 3A:
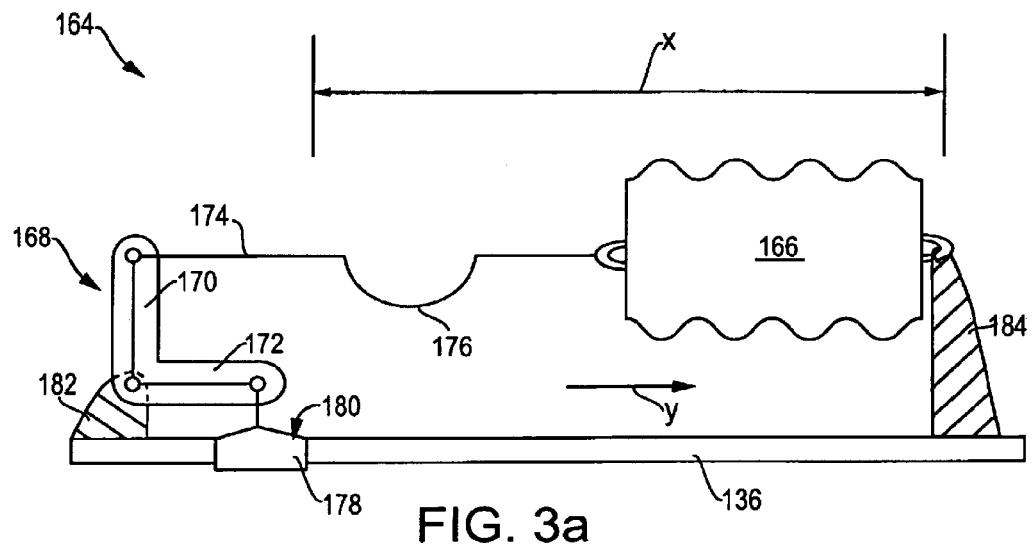
FIG. 3a is an enlarged view of the bleed off mechanism shown in circle III of FIG. 2.
Figure 3B:
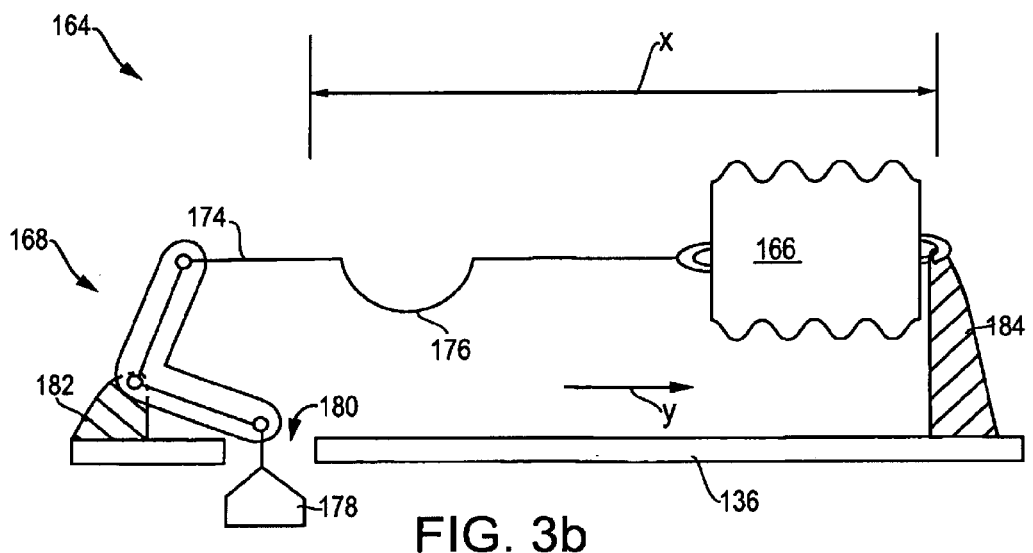
FIG. 3b is another enlarge view of the bleed off mechanism shown in circle III of FIG. 2.
Figure 4:
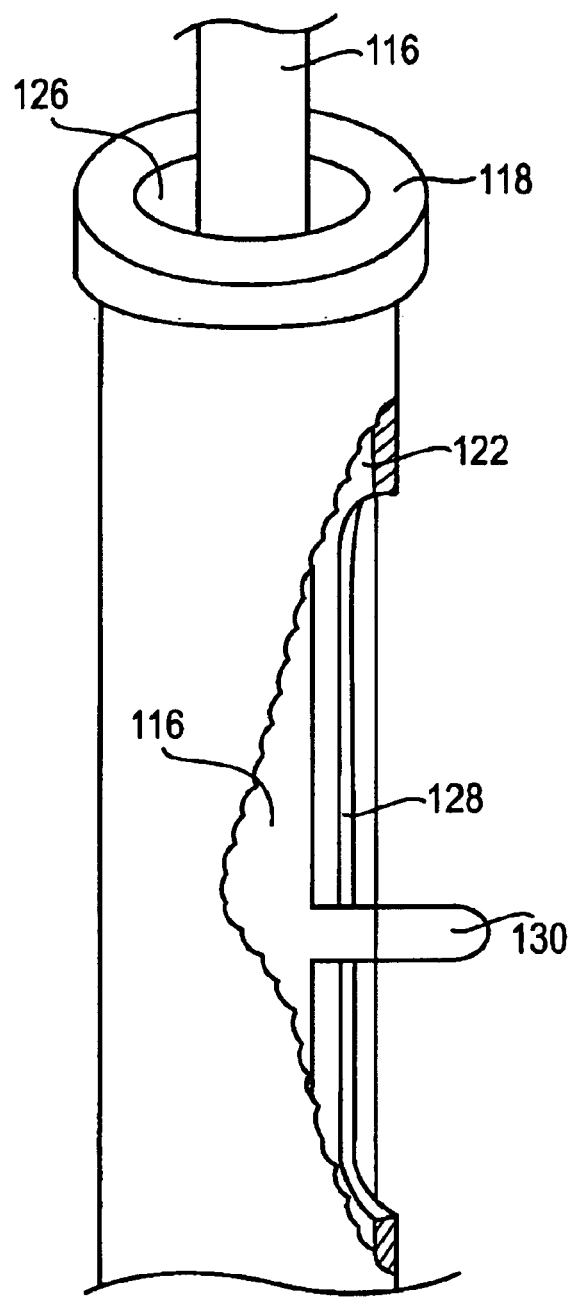
FIG. 4 is an enlarged partial cross-sectional view the annular pipe of FIG. 2.

With specific reference to FIGS. 2–4, there is shown a pressure regulator system 110 in a working relationship with a system for flowing fluid media that includes an inlet conduit 132 and an outlet conduit 136. As with the pressure regulator system 10 shown in FIG. 1, the pressure regulator system 110 is a dual port type, although it should be appreciated that a single port type may also be utilized. The inlet conduit 132 ends at a closed end 134. The pressure regulator system 110 includes tamper resistant features. Specifically, the pressure regulator system 110 includes first and second diaphragms 112 and 160; first, second and third springs 114, 120 and 162; first and second rods 116 and 152; an annular pipe 122; and, first and second seats 138 and 142 (FIG. 2). Further, the pressure regulator system 110 includes a bleed off mechanism 164 (FIGS. 2, 3a, 3b). While an annular pipe 122 is shown, it should be appreciated that any form of pipe with or without an annulus, including for example, a rod or a piston, may be used.

The first spring 114 exerts a biasing force F on the first diaphragm 112, which translates the force to the first rod 116. At an end of the first rod 116 is positioned a pin 130 (FIGS. 2, 4). The first rod 116 extends into a channel 126 of the annular pipe 122. The annular pipe 122 has a slot 128 through which the pin 130 extends, thereby retaining the first rod 116 within the channel 126 of the annular pipe 122. The slot 130 should be of sufficient length to allow for a complete stroke of the spring 114. A collar 118 is positioned at a point on the first rod 116 between the first diaphragm 112 and the pin 130.

The annular pipe 122 has a lip 124, and the second spring 120 is positioned between the lip and the collar 118. The biasing force F of the first spring 114 is translated through the first rod 116 and the collar 118 to the second spring 120, which in turn translates the biasing force onto the annular pipe 122. The first and second seats 138, 142, which are mounted on the annular pipe 122 are pushed out of sealing arrangement with the inlet conduit 132. Specifically, with movement of the annular pipe 122 in the direction of the biasing force F, the sealing surface 146a of the first seat 138 and the sealing surface 146b of the second seat 142 are moved out of contact with, respectively, apertures or ports 140, 144 of the inlet conduit 132, allowing flow from the inlet conduit 132 to continue into and through the outlet conduit 136. Up to a point, the greater the biasing force F, the greater the movement of the annular pipe 122, and thus the greater the area of the apertures 140, 144 available for flow of the fluid media from the inlet conduit 132 to the outlet conduit 136. At the point where the biasing force F has caused the pin 130 to move to a lowest portion of a slot 128, the translation of any greater amount of the force F to the annular pipe 122 and the seats 138, 142 is inhibited since the collar 118 cannot further depress the second spring 120 against the lip 124.

Next will be described a tamper resistant pressure safety device of the present invention. The tamper resistant pressure safety device includes a first bleed pipe 148, a housing 153, and a bleed off mechanism 164. The first bleed pipe 148 extends from the inlet conduit 132 to the housing 153. The housing 153 includes a first chamber 154 separated from a second chamber 156 by a second diaphragm 160. Specifically, the bleed pipe 148 extends into and feeds the first chamber 154. A fixed restriction section 150 is located at an end of the first bleed pipe 148 within the first chamber 154. Since the inlet conduit 132 is in fluid communication with the first chamber 154 through the first bleed pipe 148, the first chamber is at the inlet pressure $P_1$.

The second chamber 156 is in fluid communication with the outlet conduit 136 through a second bleed pipe 158, and thus the second chamber 156 is at the outlet pressure $P_2$. A third spring 162 is positioned beneath and exerts a biasing force B against the second diaphragm 160. The second diaphragm 160 is maintained at an equilibrium. pressure state due to the countervailing forces of the inlet pressure $P_1$ exerted in the biasing force F direction and the outlet pressure $P_2$ and the biasing force B exerted by the third spring 162. A second rod 152 is positioned over the second diaphragm 160 and, as illustrated, the third spring 162. The third spring 162 exerts a greater force than the second spring 120. As will be described in greater detail, the second rod 152 is movable due to changes in the relative pressures $P_1$, $P_2$ in the chambers 154, 156.

The bleed off mechanism 164, shown in greater detail in FIGS. 3a and 3b, is sealed against a wall of the outlet conduit 136 and includes a bellows 166 attached to a bleed valve 168 through a third rod 174. FIG. 3a shows the bellows 166 in its expanded state, while FIG. 3b shows the bellows in its contracted or compressed state. The bellows 166, which has a length that is dependent upon temperature, is anchored to the outlet conduit 136 via an anchor 184, while the bleed valve 168 is anchored to the outlet conduit 136 via an anchor 182. The bleed valve 168 includes first and second legs 170, 172. The third rod 174 is connected to the first leg 170. A third seat 178 is connected to the second leg 172 and is movable with respect to a third aperture 180 in the outlet conduit 136. As shown in FIG. 3a, the third seat 178 is lodged in the third aperture 180, while in FIG. 3b the third seat 178 is no longer in contact with the third aperture 180. The third rod 174 includes a bimetallic temperature corrector 176 which acts to maintain a distance X constant with varying temperatures by compensating for the temperature-induced change in the temperature-dependent length of the bellows 166. The distance X extends from the end of the bellows 166 connected to the anchor 184 to any point between the bimetallic temperature corrector 176 and the first leg 170 of the bleed valve 168.

Next will be described the operation of the bleed off mechanism 164. Upon the occurrence of the outlet pressure $P_2$ exceeding a predetermined pressure, the bellows 166 is compressed by the outlet pressure $P_2$. The compression of the bellows 166 in turn creates a pulling force through the third rod 174 on the bleed valve 168. The leg 170 of the bleed valve 168 is pulled in the direction of the bellows 166, thereby unseating the third seat 178 from the aperture 180. The bimetallic temperature corrector 176 inhibits temperature from affecting the movement of the leg 170 of the bleed valve 168, thereby ensuring that the movement of the leg 170, and thus the unseating of the third seat 178, is based solely on the outlet pressure $P_2$ exceeding the predetermined limit.

With the aperture or port 180 opened, the inlet pressure $P_1$ is allowed to escape from the first chamber 154 at a rate faster than it enters through the first bleed pipe 148, due to the fixed restriction 150. It should be appreciated that the fixed restriction 150 may be any suitable restriction, such as, for example, an orifice or a narrowing internal diameter, i.e. a crimp. As the inlet pressure $P_1$ decreases in the first chamber 154, eventually the combination of forces in the second chamber 156 from the outlet pressure $P_2$ and the third spring 162 push the second diaphragm 160, and hence the second rod 152, upwardly. The second rod 152 contacts with and moves the seats 138, 142 upwardly, thereby closing off the apertures 140, 144. Through this arrangement, if the outlet pressure $P_2$ exceeds a certain, predetermined safety limit, the bleed off mechanism 164 can act to shut down the flow into the outlet conduit 136. Since the bleed off mechanism 164 is sealed within the outlet conduit 136, it is resistant to tampering, as well as to the vagaries of temperature and operator error. Thus, the bleed off mechanism 164 serves as an independent, tamper-proof regulator of outlet pressure and functions as a second pressure regulator capable of overriding the first pressure regulator. Since the first pressure regulator can be sabotaged, a second pressure regulator with an overriding capacity and which is tamper-proof provides enhanced security for the flow of fluids in pipelines.

Figure 5:
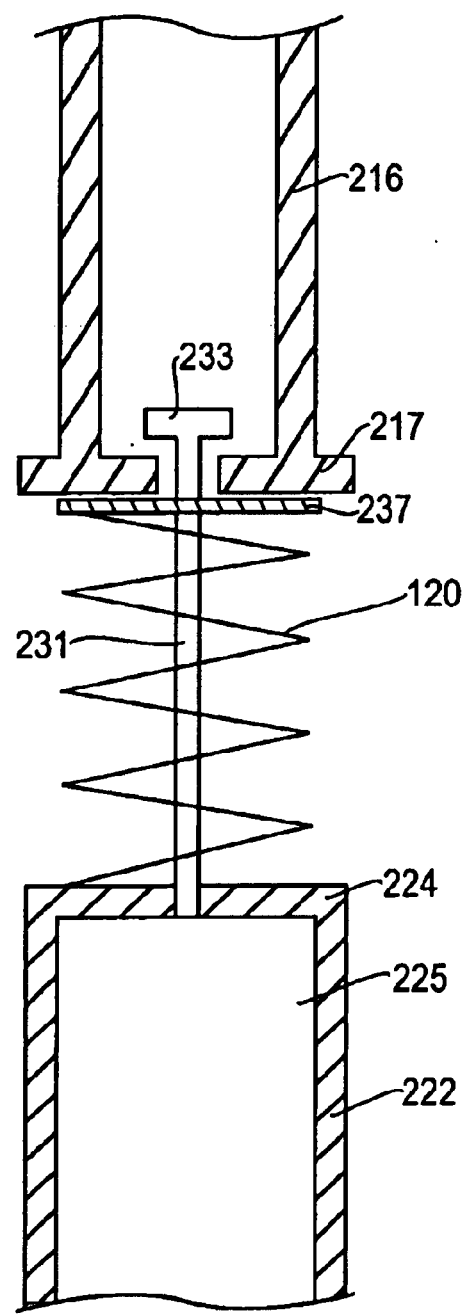
FIG. 5 is an enlarged partial cross-sectional view of the first rod and the annular pipe constructed in accordance with another embodiment of the invention.

Next will be described, with reference to FIG. 5, a different coupling arrangement between the first rod and the annular pipe. As shown, a first rod 216 includes a ledge 217 with radially inwardly and outwardly projecting sections. An annular pipe 222 is shown with an end 224 closing one end of a space 225. A pin 231 extends between the first rod 216 and connects to the annular pipe 222. The pin 231 includes a protrusion 233 at one end of the pin 231 within the first rod 216. The protrusion 233 is trapped within the first rod 216 by the inwardly projecting sections of the ledge 217. A collar 237 is positioned on the pin 231 near the protrusion 233. A second spring 120 is biased between the collar 237 and the end 224 of the annular pipe 222. The pin 231 is attached to the annular pipe 222, and thus through this arrangement the spring 120 can be compressed but the first rod 216 and the annular pipe 222 cannot be pulled apart as they are held in a coextensive arrangement by the pin 231. It should be appreciated that instead of an annular pipe 222 a rod, piston or other type of pipe may be used.

In operation, the diaphragm 112 and the first spring 114 exert an inlet pressure $P_1$ on the first rod 216, which in turn biases the pin 231, through the collar 237, and the second spring 120 toward the annular pipe 222. The biasing force of the springs 114, 120 and the first diaphragm 112 are translated to the annular pipe 222.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A pressure regulating system for regulating pressure in a flow system having an inlet conduit with an inlet pressure and an outlet conduit with an outlet pressure, comprising:
    a first pressure regulator, including:
        a first diaphragm;
        a first rod connected to said first diaphragm;
        a first spring positioned to exert a force on said first diaphragm and said first rod;
        a pipe receiving an end of said first rod; and
        at least one seat mounted on said pipe, each said seat capable of sealing, an apertures in the inlet conduit; and
    a second pressure regulator mounted in a location to inhibit tampering and including a bleed off mechanism mounted within and capable of inhibiting flow to the outlet conduit.

2. The pressure regulating system of claim 1, wherein said second pressure regulator includes:
    a first bleed pipe; and
    a housing, said first bleed pipe extending from the inlet conduit into said housing.

3. The pressure regulating system of claim 2, further including a second spring, wherein said first rod includes a collar and said pipe includes a lip, said second spring being biased between said collar and said lip.

4. The pressure regulating system of claim 3, wherein said pipe is an annular pipe including a slot, said first rod including a pin extending into said slot.

5. The pressure regulating system of claim 2, wherein said housing includes a first chamber at the inlet pressure and into which said first bleed pipe extends, a second chamber at the outlet pressure and separated from said first chamber by a second diaphragm, and a second bleed pipe extending from said second chamber to the outlet conduit.

6. The pressure regulating system of claim 5, wherein said first bleed pipe includes a fixed restriction in an end within said first chamber.

7. The pressure regulating system of claim 6, wherein said first chamber includes a second rod extending into the outlet conduit and capable of contacting said pipe, wherein said second chamber includes a second spring providing biasing force on said second diaphragm and said second rod.

8. The pressure regulating system of claim 7, wherein said bleed off mechanism comprises:
    a bellows anchored to the outlet conduit;
    a bleed valve anchored to the outlet conduit;
    a third rod connecting said bellows and said bleed valve; and
    a bleed off mechanism seat capable of sealing an aperture in the outlet conduit.

9. The pressure regulating system of claim 8, wherein said bleed off mechanism is sealed within the outlet conduit.

10. The pressure regulating system of claim 8, wherein said bellows is adapted to be compressed upon pressure within the outlet conduit exceeding a predetermined level, said compression unseating said bleed off mechanism seat from said aperture in the outlet conduit.

11. The pressure regulating system of claim 10, wherein said bleed valve includes a first leg connected to said third rod and a second leg connected to said bleed off mechanism seat.

12. The pressure regulating system of claim 10, wherein said third rod includes a bimetallic temperature corrector adapted to inhibit a change in temperature from affecting compression of said bellows.

13. A pressure regulating system for regulating pressure in a flow system having an inlet conduit with an inlet pressure and an outlet conduit with an outlet pressure, comprising:
    a first pressure regulator, including:
        a first diaphragm;
        a first rod including a collar and a pin and being connected to said first diaphragm;
        a first spring positioned to exert a force on said first diaphragm and said first rod;
        an annular pipe including a lip and a slot for receiving said pin;
        a second spring biased between said collar and said lip; and
        first and second seats mounted on said annular pipe, said seats capable of sealing, respectively, first and second apertures in the inlet conduit; and a second pressure regulator, including:

a first bleed pipe;

a housing, said first bleed pipe extending from the inlet conduit into said housing, said housing including a first chamber at the inlet pressure and into which said first bleed pipe extends, a second chamber at the outlet pressure and separated from said first chamber by a second diaphragm, and a second bleed pipe extending from said second chamber to the outlet conduit; and a bleed off mechanism mounted within and capable of inhibiting flow to the outlet conduit.

14. The pressure regulating system of claim 13, wherein said bleed off mechanism comprises:

a bellows anchored to the outlet conduit;

a bleed valve anchored to the outlet conduit;

a third rod connecting said bellows and said bleed valve; and a third seat capable of sealing a third aperture in the outlet conduit.

15. The pressure regulating system of claim 14, wherein said bellows is adapted to be compressed upon pressure within the outlet conduit exceeding a predetermined level, said compression unseating said third seat from said third aperture.

16. The pressure regulating system of claim 15, wherein said bleed valve includes a first leg connected to a second leg, said first leg further connected to said third rod and said second leg further connected to said third seat.

17. The pressure regulating system of claim 16, wherein said third rod includes a bimetallic temperature corrector adapted to inhibit a change in temperature from affecting compression of said bellows.

18. A method of inhibiting tampering of a pressure regulating system regulating pressure in a flow system having an inlet conduit with an inlet pressure and an outlet conduit with an outlet pressure, said method comprising the steps of:

providing a first pressure regulator, including:

a first rod connected to a first diaphragm;

a first spring positioned to exert a force on said first diaphragm and said first rod;

a pipe receiving an end of said first rod; and at least one seat mounted on said pipe, each said seat being capable of sealing a respective aperture in the inlet conduit; providing a second pressure regulator, including:

a first bleed pipe;

a housing, said first bleed pipe extending from the inlet conduit into said housing; and a bleed off mechanism mounted within and capable of inhibiting flow to the outlet conduit; and upon the outlet pressure in the outlet conduit exceeding a predetermined value, enabling said second pressure regulator to inhibit flow into the outlet conduit.

19. The method of claim 18, wherein said bleed off mechanism comprises:

a bellows anchored to the outlet conduit;

a bleed valve anchored to the outlet conduit;

a connecting rod connecting said bellows and said bleed valve; and a bleed off mechanism seat capable of sealing an aperture in the outlet conduit; and wherein upon the outlet pressure in the outlet conduit exceeding a predetermined value said bellows compresses and exerts a force on said connecting rod and said bleed valve sufficient to unseat said bleed off mechanism seat from said aperture in the outlet conduit.

20. The method of claim 19, wherein said housing includes:

a first chamber at the inlet pressure and into which said first bleed pipe extends, said first bleed pipe including a fixed restriction in an end within said first chamber, said first chamber having a second rod extending into the outlet conduit and capable of contacting said pipe;

a second chamber at the outlet pressure and separated from said first chamber by a second diaphragm, said second chamber including a second spring providing biasing force on said second diaphragm and said second rod; and and a second bleed pipe extending from said second chamber to the outlet conduit;

wherein unseating said bleed off mechanism seat from said aperture in the outlet conduit enables removal of greater pressure from said first chamber than is added to said first chamber through said fixed restriction of said first bleed pipe.

21. The method of claim 20, wherein said unseating said bleed off mechanism seat from said aperture in the outlet conduit enables a combination of the outlet pressure in said second chamber and the biasing force of said second spring to overcome the pressure in said first chamber, thereby allowing said second rod to contact said pipe and move said at least one seat into sealing engagement with said respective aperture in the inlet conduit.

* * * * *